Patented Apr. 28, 1953

2,636,809

UNITED STATES PATENT OFFICE 2,636,809

PROCESS OF PREPARING MAGNESIA

Robert A. Schoenlaub, Cleveland, Ohio, assignor to Sylvester & Company, Cleveland, Ohio, a corporation of Ohio No Drawing. Application March 27, 1948, Serial No. 17,579

3 Claims. (Cl. 23—201)

In my patent application Serial No. 743,473, now Patent No. 2,587,656, there is set forth a process of obtaining magnesia from material including silica such as to form dicalcium silicate and spontaneously disintegrate or dust for the freeing of the magnesia. By the present invention, provision is made for treatment of compositions which primarily do not form dusting products. Furthermore, a particular feature is the production of high purity forms of magnesia. Other objects and advantages of the invention will appear from the following description.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

If dolomite be fired with iron oxide, a reaction between the iron oxide and calcium oxide of the dolomite may be effected, with formation of calcium ferrite and free magnesium oxide, as follows:

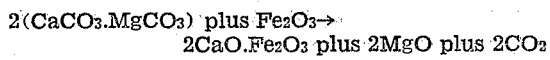

The dicalcium ferrite so formed fluxes the mixture and allows the magnesia to crystallize as periclase, the crystals growing to good size. By the further firing, part of the ferrite combines with magnesia to form magnesium ferrite as follows:

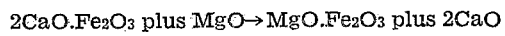

The combination of iron oxide with magnesia is particularly facilitated by reducing conditions.

This magnesium ferrite is absorbed in the periclase and renders it magnetic, thereby facilitating separation. In procedure along such line, by mixing a small amount of iron oxide with dolomite, and firing to the production of periclase, and a small amount of magnesium ferrite absorbed in the periclase crystals, the fired product may then be slaked in water at a temperature of about 80° F. until the bulk of the free lime is hydrated. It may then be made into a slurry with water, such slurry comprising periclase and colloidal calcium hydroxide, and dicalcium ferrite. The iron-bearing periclase with some attached ferrites and lime may be readily removed by passing the slurry over a magnetic separator. By again making this concentrate into a slurry with water and adding sufficient sulphuric acid to react all the CaO to calcium sulphate, plus 10 per cent excess, and agitating for about four or five minutes, the periclase thus purified may be removed in a magnetic separator and be washed.

In instances where it is desired not to add iron, dolomite may be burned alone until the magnesia crystallizes as periclase crystals of at least 5-micron size, preferably at least 10 microns. Fluxes such as boron compounds, fluorite, etc. may be added to the raw dolomite and will greatly add to the attainment of desired crystal size. A high proportion of water vapor in the combustion gases, such as obtained with natural gas fuel, will also aid in the attainment of the desired crystallinity. A preferred practice is to add about 2 parts of boric acid to each 100 parts of crushed dolomite, and this can then be fired in a rotary kiln to about 3000° F. The burned dolomite is then pulverized to about minus 200 mesh and is made up into a slurry (desirably around 7 per cent) with water. This slurry is agitated and sulphuric acid in amount sufficient to react all of the CaO, plus about a 5 per cent excess, is added slowly and the slurry is agitated for about five minutes. It will then comprise crystalline periclase and colloidal calcium sulphate. The periclase crystals are readily separable by classification, washing, or by froth flotation with fatty acids or their derivatives. Classification is particularly simple, and if applied immediately after reaction, the colloidal sulphate may be largely removed from the periclase by simple classification. Any remaining sulphate can then be washed out. In a modification of this method, the crushed dolomite can be differentially slaked in hot water, and part of the Ca(OH)$_2$ be removed by classification. Ultimately, however, to obtain a pure product, part of the CaO must be removed by acid reaction as above described.

Froth flotation is a very effective means for separating the periclase. For this, it is necessary to agitate the slurry for at least an hour or until the sulphate crystals attain a separable size. They can then be easily separated.

The foregoing refers to raw material containing negligible amounts of silica. Where material containing silica is concerned and the conditions are not initially such as to form dicalcium silicate and a self-disintegrating or dusting product as in accordance with my application Serial No. 743,473, the material may be fired on the basis of tricalcium silicate formation of the silica content. I have found that if such a tricalcium silicate material then be fired to a temperature above 3450° F., the following reaction abruptly occurs:

$$3CaO.SiO_2 \rightarrow CaO \text{ plus } 2CaO.SiO_2$$

This reaction will not shift back unless the clinker is annealed for considerable periods of time. This normally does not occur. Accordingly, where magnesia-containing raw material is operated upon in composition ranges tending to form non-dusting products, the present invention allows the processing of basic compositions of magnesia and lime and silica to primarily form a burned product of non-dusting character or containing tricalcium silicate, and then by the procedure detailed below, such primarily non-dusting products may be separated to yield the desired magnesia. Thus, non-dusting compositions containing periclase and some dicalcium silicate, or periclase and tricalcium silicate and dicalcium silicate, or periclase and lime and tricalcium silicate, or periclase and lime and some dicalcium silicate, or even periclase and lime, may be so processed. If any alumina is present in the raw material, it will be reacted simultaneously with the main reaction to form tricalcium aluminate. Calcium aluminates, titanate, ferrites, etc. may or may not be present in general.

For the preparation of high-grade magnesia, as chemical magnesia or for electrical purposes, it is desirable to start with relatively pure materials. Such may be combinations of dolomite and silica or preferably dolomite and a low-iron magnesia silicate such as talc. These compositions with absence of iron are more refractory and magnetic separation is also inapplicable in the final removal of the magnesia. However, arc or other furnaces operating at temperatures above 3500° F. can form magnesia crystals of separable size without difficulty. If a supplementary flux is not objectionable, suitable crystals can also be formed readily at lower temperatures. Such fluxes may be halogen compounds, boron compounds, compounds of sulphur, compounds of phosphorus, arsenic, antimony, selenium, and tellurium. At the high temperatures at which crystallization occurs, most of these substances are evanescent. Borates, sulphates and fluorides are partly retained. Borates, phosphates, and to a limited extent sulphates, are stabilizing agents for dicalcium silicate and are consequently antagonistic to dusting; but in this particular practice dusting is not necessary, and such mineralizers may be used. The practice in such case is as follows: The materials are ground to minus 50 mesh and combined as, for example, according to any of the batches shown in Table I below. In addition, about two parts of boric acid is added for each 100 parts of raw batch. Fluorides, salt, etc. may be used to replace or supplement the boric acid, if desired. The material is then briquetted or nodulated by mixing with water and a binder such as goulac, molasses, gums, etc. and is dried, and then fired above about 3100° F. for more than three hours, and is cooled. As the fired product neither dusts nor is magnetic, the magnesia is separated by grinding the product to about minus 200 mesh and forming into a slurry (about 5 per cent) with water and agitating. To this slurry enough sulphuric or hydrochloric acid to react all calcium compounds, a 10 per cent excess, is added and the agitation is continued for about five minutes. The slurry is then dewatered and washed. The product comprises clean discrete crystals of periclase with small amounts of colloidal calcium sulphate or soluble calcium chloride, depending upon the acid employed. The calcium sulphate may be removed by washing, classification, or flotation, or some combination thereof. With hydrochloric acid all that is required is washing with fresh water.

*Table I*

| Batch | 1 | 2 | 3 | 4 | 5 | 6 |
|---|---|---|---|---|---|---|
| Steatite | 100 | 100 | 100 | 100 | 100 | 100 |
| Dolomite | 355 | 412 | 468 | 525 | 582 | 649 |
| Pounds slag | 277 | | | 369 | | |
| Composition: | | | | | | |
| $SiO_2$ | 20.7 | 19.4 | 18.1 | 16.8 | 15.0 | 13.6 |
| $Fe_2O_3$ | .2 | .2 | .2 | .2 | .1 | .1 |
| $Al_2O_3$ | .3 | .3 | .3 | .3 | .2 | .2 |
| $CaO$ | 40.1 | 41.6 | 43.2 | 44.7 | 45.6 | 46.5 |
| $MgO$ | 38.6 | 38.7 | 38.8 | 38.9 | 39.1 | 39.2 |
| Minerals: | | | | | | |
| $3CaO.SiO_2$ | 0.0 | 20.0 | 40.1 | 60.2 | 9 | 51.7 |
| $2CaO.SiO_2$ | 60.73 | 40.48 | 20.24 | 0.0 | | |
| $3CaO.Al_2O_3$ | .7 | .7 | .6 | .6 | .5 | .5 |
| $CaO$ | | | | 0.0 | 4.1 | 8.2 |
| $MgO$ | 38.9 | 38.9 | 38.9 | 38.9 | 38.5 | 39.2 |
| $Fe_2O_3$ | .1 | .1 | .1 | .1 | .1 | .1 |

Where a less pure magnesia product is desired, the material may be dolomite mixed with talc, silica, serpentine, or olivine calculated to give any mixture of magnesia and CaO and dicalcium silicate which may be desired. Typical batches which can be used are shown in Table II.

*Table II*

| Batch | 1 | 2 | 3 | 4 | 5 | 6 |
|---|---|---|---|---|---|---|
| Serpentine | 100 | 100 | 100 | 100 | 100 | 100 |
| Dolomite | 250 | 295 | 340 | 385 | 430 | 475 |
| Pounds of slag | 215 | 244 | 273 | 283 | 312 | 341 |
| Composition: | | | | | | |
| $SiO_2$ | 18.7 | 17.2 | 15.7 | 14.3 | 12.8 | 11.4 |
| $Fe_2O_3$ | 3.2 | 2.9 | 2.6 | 2.4 | 2.1 | 1.9 |
| $Al_2O_3$ | .6 | .6 | .5 | .5 | .5 | .4 |
| $CaO$ | 35.6 | 37.6 | 39.7 | 41.7 | 43.7 | 45.8 |
| $MgO$ | 41.9 | 41.9 | 41.8 | 41.8 | 41.8 | 41.7 |
| Minerals: | | | | | | |
| $2CaO.SiO_2$ | 53.9 | 49.6 | 45.3 | 41.0 | 36.7 | 32.4 |
| $3CaO.Al_2O_3$ | 1.2 | 1.2 | 1.3 | 1.3 | 1.3 | 1.4 |
| $CaO$ | .0 | 4.7 | 9.4 | 14.0 | 18.8 | 23.5 |
| $MgO$ | 41.9 | 41.7 | 41.5 | 41.3 | 41.1 | 40.9 |
| $Fe_2O_3$ | 3.2 | 2.9 | 2.7 | 2.4 | 2.1 | 1.9 |

Illustrative compositions of raw materials are shown in Table III.

*Table III*

| | Serpentine | Dolomite | Steatite |
|---|---|---|---|
| $SiO_2$ | 39.41 | .34 | 56.60 |
| $Fe_2O_3$ | 6.7 | .074 | .19 |
| $Al_2O_3$ | 1.26 | .04 | .70 |
| $CaO$ | .44 | 30.60 | 3.88 |
| $MgO$ | 37.58 | 21.10 | 33.20 |
| Ig. Loss | 14.56 | 47.31 | 5.09 |

The raw materials should be ground to minus 50 mesh but should not contain too much material which is minus 150 mesh. Between 10 and 30 per cent of dolomite used may be in the calcined form to provide a bond. The mixture is tempered with a small amount of water and is pressed or otherwise formed into briquets or nodules. Coal or coke fuel can, if desired, be admixed with the batch. The briquets are then passed through a furnace. Firing should be carried above 3450° F.

for a time exceeding about twenty minutes, to change any initial silicate to dicalcium silicate as above indicated, and also form CaO and crystallize the periclase in a form suitable for separation. The fired product is cooled and allowed to dust. If an electric furnace is used and the mixture is fused, the product must not be cooled too rapidly nor too slowly, but at such a rate as to facilitate the dusting disintegration. The dust is then slurried in water and the magnesia separated by magnetic means if the iron content in the periclase is sufficient, or may be separated by classification, flotation, grinding or acid leaching, as indicated. With CaO present, some may go through the initial cleaning operation. This may be removed by hydration, preferably with hot water, to form colloidal Ca(OH)$_2$, and then by washing. The periclase is substantially insensitive to hydration.

In general in the present invention, operation is conducted to convert the magnesia content into a form resistant against hydration to Mg(OH)$_2$ by water, and in subsequent treatment in aqueous media the MgO is maintained un-attacked but the undesired components are acted upon.

As examples, the following are illustrative:

I. For a magnesia product which may contain some iron, 100 parts of dolomite are mixed with five parts of mill scale and ground to minus 50 mesh, and mixed with about 20 parts of coke and fired to about 3100° F. in a shaft kiln. The resulting clinker is crushed to minus 100 mesh and formed into about 15 per cent slurry and agitated for about three hours or until the 3CaO is substantially hydrated, but the MgO is substantially anhydrous, and the slurry is run over a magnetic drum and a magnesia concentrate obtained. This concentrate is then made into a 10 per cent slurry and about ½ pound of concentrated sulphuric acid for each pound of concentrate, or as much as needed for a specified purity, is added. After agitating for two to ten minutes, the cleaned periclase is removed magnetically. The composition is about as follows:

| | |
|---|---:|
| SiO$_2$ | 0.2 |
| CaO | 0.7 |
| Al$_2$O$_3$ | 0.1 |
| Fe$_2$O$_3$ | 3.2 |
| MgO | 95.0 |

II. Dolomite crushed to about minus ¼" is mixed with about 1 part of boric acid per 100 of dolomite, and is fired in a rotary kiln to above 3000° F., cooled and ground to about minus 300 mesh. This is made into a slurry containing 5 parts of calcine per 100 parts of water, and 5.5 parts of 66° sulphuric acid is slowly added with violent agitation. After about five minutes, the slurry is de-watered by centrifuging and the colloidal matter classified out. The residue is then washed free of sulphates, and has a composition on calcine bases as follows:

| | Per cent |
|---|---:|
| MgO | 98.1 |
| CaO | 1.2 |
| Al$_2$O$_3$ | 0.2 |
| Fe$_2$O$_3$ | 0.1 |
| SiO$_2$ | (0.3) |

Alternatively 13.3 parts of 27 per cent HCl may be added instead of sulphuric acid and the residue merely washed and dried.

III. Dolomite and serpentine ground to minus 50 mesh are combined in proportions of 385 parts by weight of dolomite and 100 parts of serpentine. The material is nodulated, using an organic binder, and fired to 3600° F., and then cooled rapidly to about 3000° F., and more slowly then to room temperatures, to disintegrate to dust. The dust is lightly milled and then slurried, and the slurry is run over a small magnetic drum. This concentrate is again slurried and run over a weaker magnetic drum. A concentrate comprising more than 80 per cent of magnesia available is obtained with the following composition:

| | |
|---|---:|
| MgO | 87.2 |
| CaO | 5.7 |
| Fe$_2$O$_3$ | 5.3 |
| Al$_2$O$_3$ | 0.4 |
| SiO$_2$ | 1.9 |

IV. Steatite and dolomite, as shown in Table I, are ground to minus 50 mesh, mixed with boric acid and an organic bond, and nodulated. The batch may comprise steatite 100 parts, dolomite 525, and boric acid 5. This is fired to about 3100° F., cooled, and ground to about minus 300 mesh, and is made into a 10 per cent slurry with water, and hydrochloric acid is added with agitation. The amount of hydrochloric acid may be about 2 parts of commercial acid for every part of the slag. After agitating for four or five minutes, the slurry is de-watered, and the products washed. The dried product analyzes about as follows, the recovery of available magnesia being about 90 per cent:

| | Per cent |
|---|---:|
| MgO | 97.94 |
| CaO | 0.0 |
| Al$_2$O$_3$ | 0.34 |
| Fe$_2$O$_3$ | 0.68 |
| SiO$_2$ | 1.04 |

Other modes of applying the principle of the invention may be employed, change being made as regards the detail described, provided the features stated in any of the following claims, or the equivalent of such, be employed.

I therefore particularly point out and distinctly claim as my invention:

1. In a process of preparing periclase, the steps comprising mixing with dolomite a small per cent of iron oxide, firing in the presence of added silica to formation of a silicate matrix, and periclase resistant against water-slaking, and calcium ferrite, further firing and absorbing the formed iron compound into the periclase, slurrying this product with water and slaking CaO to hydroxide while maintaining the periclase as oxide, removing the periclase by magnetic means, selectively cleaning any calcium hydroxide from the periclase by mineral acid solution, and finally washing the periclase with water.

2. In a process of preparing periclase, the steps cimprising firing magnesian and calcareous material in the presence of added silica at a temperature below 3400° F. to formation of a product including magnesia and tricalcium silicate, then changing the tricalcium silicate to dicalcium silicate by raising the temperature of this product to the temperature range decomposing tricalcium slicate, and finally separating the magnesia.

3. In a process of preparing periclase, the steps comprising firing magnesian and calcareous material in the presence of added silicious material to formation of a product containing tricalcium silicate, then decomposing the tricalcium silicate to dicalcium silicate by raising the temperature of this product to at least 3450° F., and finally separating the magnesia.

ROBERT A. SCHOENLAUB.

References Cited in the file of this patent

UNITED STATES PATENTS

| Number | Name | Date |
|---|---|---|
| 1,270,819 | Handy et al. | July 2, 1918 |
| 1,527,347 | Browne | Feb. 24, 1925 |
| 1,542,684 | Everhart | June 16, 1925 |
| 1,816,996 | Barrett | Aug. 4, 1931 |
| 2,343,151 | MacIntire | Feb. 29, 1944 |
| 2,380,480 | Syz | July 31, 1945 |
| 2,393,920 | MacIntire | Jan. 29, 1946 |

OTHER REFERENCES

Chem. Abs. 18, 5370 (1944).

Bureau of Mines, I. C. 7269 (Dec. 1942), pages 8 to 11.

Bureau of Mines, I. C. 7247 (Aug. 1943), pages 4 to 9.